United States Patent [19]

Taisuke et al.

[11] Patent Number: 4,835,066

[45] Date of Patent: May 30, 1989

[54] PLATED STEEL SHEET HAVING EXCELLENT COATING PERFORMANCE

[75] Inventors: Irie Taisuke, Izumi; Kotegawa Junichi, Izumisano; Watanabe Koichi, Amagasaki; Hukuda Satoshi, Osaka, all of Japan

[73] Assignee: Nisshin Steel Co., Ltd., Tokyo, Japan

[21] Appl. No.: 123,111

[22] PCT Filed: Mar. 27, 1987

[86] PCT No.: PCT/JP87/00190

§ 371 Date: Oct. 30, 1987

§ 102(e) Date: Oct. 30, 1987

[87] PCT Pub. No.: WO87/05950

PCT Pub. Date: Oct. 8, 1987

[30] Foreign Application Priority Data

Jan. 25, 1986 [JP] Japan .................................. 61-14499
Mar. 29, 1986 [JP] Japan .................................. 61-71884

[51] Int. Cl.⁴ .............................................. B32B 15/00
[52] U.S. Cl. ................................... 428/659; 428/935
[58] Field of Search ............................... 428/659, 935

[56] References Cited

U.S. PATENT DOCUMENTS 4,125,679 11/1978 Mino et al. ........................ 428/659
4,243,730 1/1981 Nakayama et al. ............... 428/659

FOREIGN PATENT DOCUMENTS 54-112731 9/1979 Japan ................................. 428/659
56-142885 11/1981 Japan .
59-116393 7/1984 Japan .

*Primary Examiner*—Deborah Yee
*Attorney, Agent, or Firm*—Foley & Lardner, Schwartz, Jeffery, Schwaab, Mack, Blumenthal & Evans

[57] ABSTRACT

When a single-layer plated steel sheet comprising a coating of pure Zn or a Zn alloy (for example, a Zn-Fe alloy, a Zn-Ni alloy, etc.) is used in such a use that cationic electrodeposition coating is carried out as in the case of components for automobile bodies, craterings are generated on a coating film at the time of the electrodeposition coating to impair the coating appearance. Accordingly, this invention is to make it possible to stably restrain the generation of craterings on a coating film by providing a coating comprising Fe containing boron (B) or a coating comprising an Fe-Zn alloy having a boron-containing Fe percentage of 50% or more, on the surface of the coating of the pure Zn- or a Zn alloy-plated steel sheet.

The boron content in the Fe coating or the Fe-Zn alloy coating may be preferably controlled to 0.001 to 3 wt. %. The coating weight may be preferably controlled to 0.5 to 10 g/m² (per one side) in the case of the Fe coating, and 0.2 to 8 g/m² (per one side) in the case of the Fe-Zn alloy coating.

12 Claims, No Drawings

PLATED STEEL SHEET HAVING EXCELLENT COATING PERFORMANCE

TECHNICAL FIELD

This invention relates to a plated steel sheet excellent in the appearance of a coating when applied in such a use that cationic electrodeposition coating is carried out as in the case of components for automobile bodies.

BACKGROUND ART

In North America, Canada, North Europe and elsewhere, rock salt is sprayed in winter for preventing roads freezing, and therefore steel sheets used for the components of automobile bodies are required to have excellent corrosion-resisting performance. For this reason, in such a use, there have been recently applied pure zinc-plated steel sheets or zinc alloy-plated steel sheets (for example, Zn-Fe alloy-plated steel sheets, Zn-Ni alloy-plated steel sheets, and so forth) having excellent corrosion resistance.

However, there has been a problem that, in the case of a single-layer coating, these plated steel sheets may bear craterings generated on a coating film when the cationic eletrodeposition coating is carried out after phosphating, to give poor appearance of the coating.

Now, as a steel sheet that has solved the problem of the coating appearance, a double-layer plated steel sheet has been proposed, wherein an Fe coating that can achieve a good electrodeposition coating performance is further applied on a pure Zn or Zn alloy coating. Conventionally known steel sheets of this type may include those wherein an upper layer comprises an Fe-Zn alloy coating having an Fe content of 60 to 90 wt. %, and those wherein an upper layer comprises an Fe coating. It is true that the application of the cationic electrodeposition coating on these double-layer plated steel sheets may result in generation of a decreased number of craterings on a coating film and can improve the coating appearance.

However, in order to lessen the generation of craterings on a coating film by providing the Fe-Zn alloy coating having Fe content of 60 to 90 wt. %, the coating weight must be made not less than 5 g/m² (per one side), necessarily resulting in higher production cost. Moreover, this Fe alloy coating is so hard and brittle that an infinite number of cracks may be formed when a plated steel sheet is worked into a component, with the result that the lower layer is exposed at the cracked portion. Therefore, when the electrodeposition coating is carried out, it follows that the electrodeposition coating is directly applied on the lower layer, and also that craterings are liable to be generated on the coating film.

On the other hand, in the case of the Fe coating, which is softer than the Fe-Zn alloy coating, no cracks are generated even when the plated steel sheet is worked into a component, and only a little cratering is generated on the coating film. However, if the coating weight is less than 3 g/m² (per one side), there is seen variation in the quantity of the generation of craterings. Although the variation factor has not been made clear, this is presumably because the covering rate in the upper layer coating relative to the lower layer coating is so poor, or the purity of the upper layer coating is so high, that large crystals of phosphate may tend to be formed during phosphating which is a pre-treatment for the electrodeposition coating, and, as a result, the rate of covering by the phosphate crystals on the surface of a coating may be lowered and also the variation in the covering rate may be caused to bring about a difference in the electrolytic conduction for electrodeposition coating, between the phosphate-deposited portion and non-deposited portion. Therefore, in order to lessen the generation of craterings on a coating film by providing the Fe coating, the coating weight must be 3 g/m² (per one side), also necessarily resulting in higher production cost.

Taking account of the fact of that the electrodeposition coating performance has not been perfect even in the double-layer plated steel sheet obtained by applying the Fe coating on the pure Zn coating or Zn alloy coating as mentioned above, this invention aims at providing a plated steel sheet that has been improved with regard to the electrodeposition coating performance and yet can achieve lower production cost.

SUMMARY OF THE INVENTION

This invention provides a plated steel sheet which is comprised of a plated steel sheet comprising a lower layer coating of pure Zn or a Zn alloy, provided on a steel sheet, and an upper layer coating of boron(B)-containing Fe or an Fe-Zn alloy having a boron-containing Fe percentage of 50 wt. % or more, provided on said lower layer coating, thereby making it possible to prevent craterings being generated on a coating film and lessen the upper layer coating weight.

The reason why the plated steel sheet of this invention can have an excellent electrodeposition coating performance is presumed to be that the presence of boron added to a bath at the time of the plating for the upper layer can improve the uniformity of the electrodeposition to give a uniform coating, and also that the boron contained in the upper layer can serve as a nucleus at the time of the deposition of phosphate when phosphating is applied as a pre-treatment for the electrodeposition coating, to form a fine and dense phosphate coating, and, as a result, the electrolytic conduction on the entire surface of a steel sheet becomes uniform, whereby a coating material can be uniformly electrodeposited at the time the electrodeposition coating is carried out, and thus the generation of craterings can be stably restrained.

DETAILED DESCRIPTION OF PREFERRED EMBODIMENTS

The plated steel sheet of this invention can restrain the generation of craterings in a coating film even when the coating weight is not more than 3 g/m² per one side in the case where the upper layer comprises the boron-containing Fe coating, or even when the coating weight is not more than 5 g/m² per one side in the case where the upper layer comprises the above element-containing Fe alloy coating. This is presumably because, even if the coating weight is small, the upper layer can cover the lower layer so excellently that the rate of covering of the lower layer by the upper layer can be improved.

In the case where the upper layer comprises the Fe-Zn alloy coating, it has been conventionally impossible to lessen the generation of craterings in a coating film unless the Fe content is controlled to 60 to less than 100 wt. %. However, the presence of boron contained therein makes it possible to lessen the generation of craterings in a coating film even if the Fe content is decreased to 50 to less than 100 wt. %. This is presumably because of the above mentioned effect of improving the phosphating performance, and once the Fe content can be decreased like this, the difference in the corrosion potential between the upper layer and the lower layer becomes small, whereby the corrosion resistance of the coatings as a whole for a long period can be improved.

The amount of boron contained in the upper layer may preferably be controlled to 0.001 to 3 wt. %. This is because a boron amount of less than 0.001 wt. % may result in no difference from an upper layer containing no boron in respect of the generation of craterings and variation thereof in the electrodeposition coating, and the boron amount more than 3 wt. % may result in saturation of the effect so that it is meaningless to make the amount larger than that.

The covering weight on the upper layer (per one side) may be preferably controlled to 0.5 to 10 g/m$^2$ in the case of the boron-containing Fe coating, and 0.2 to 8 g/m$^2$ in the case of the Fe alloy coating. This is because the weight of less than 0.5 g/m$^2$ or 0.2 g/m$^2$ may make it impossible to achieve perfect covering of the lower layer to bring about the generation of craterings in a coating film to be caused by the exposure of the lower layer at the time of the electrodeposition coating, and the weight more than 10 g/m$^2$ or 8 g/m$^2$ may result in saturation of the effect of restraining the generation of craterings in a coating film so that it is unnecessary to make the coating weight larger than that. Meanwhile, in the case of the conventional upper layer coating comprising the Fe-Zn alloy containing no boron, the effect of restraining the generation of craterings in a coating film has been saturated when the weight is 10 g/m$^2$. The effect by virtue of the addition of boron can be seen also in this point, in respect of the decrease in the coating weight.

In order to codeposite boron into the upper layer in an amount of 0.001 to 3 wt. % according to electroplating, the plating may be carried out by adding one or more of boron compound(s) such as boric acid, metaboric acid, water soluble metaborate, water soluble tetraborate and tetrafluoroborate to an ordinary Fe plating bath or a plating bath of an Fe alloy such as an Fe-Zn alloy and an Fe-Ni alloy, and adjusting the pH of the bath to 1 to 3.

The steel sheet according to this invention can improve the performance in the electrodeposition coating of a pure Zn-plated or Zn alloy-plated steel sheet. However, in the case the lower layer comprises an Zn alloy coating of a Zn-Ni or Zn-Fe alloy, the generation of craterings can be restrained even with inclusion of a trace amount of one or more of elements such as Ni (in respect of the Zn-Fe alloy), Fe (in respect of the Zn-Ni alloy), Co, Cr, Mn, Mo and Ti. In case the lower layer comprises a pure Zn coating, it can be also restrained even with respect to coatings obtained by carrying out electroplating, vacuum deposition or hot dipping. Further, in the case the upper layer comprises the Zn alloy coating, it can be also restrained even with respect, in addition to the coatings formed by the above methods, to those which are alloyed into a Zn-Fe alloy by thermal diffusion after carrying out hot dip zinc coating or vacuum zinc deposition as in the case of an alloyed zinc-plated steel sheet.

This invention will be described below more specifically by Examples.

EXAMPLE 1

On a cold rolled steel sheet of 0.8 mm thick, usual treatments of degreasing and acid pickling were applied to make its surface clean. Thereafter, a lower layer coating comprising pure Zn, an Zn-Fe alloy or Zn-Ni alloy was first provided according to electroplating under the conditions as shown in Table 1, and next an upper layer coating comprising Fe or Fe-B was provided on it according to the same plating method.

Subsequently, from the thus plated steel sheet, samples were collected of 10 sheets per each plating condition, which were treated with a commercially available phosphating solution (Bt 3030; produced by Nippon Parker Co.), followed by carrying out cationic electrodeposition coating to examine the number of craterings generated on the coatings after drying by baking. In the electrodeposition, Electron #9000 (produced by Kansai Paint Co., Ltd.) was used as a coating material, which was electrodeposited according to an instantaneous voltage-increasing method (the so-called "dokan" method) under 300 V to have a coating film thickness of 25 um, and the baking was carried out at 180° C. for 20 minutes. The number of craterings generated in the coating film when provided with an Fe-B coating as the upper layer is shown in Table 2.

As will be clear from Table 2, the steel sheets of this invention, provided with an Fe-B coating as the upper layer, show less generation of craterings and variation thereof than those in conventional double-layer plated steel sheets provided with an upper layer Zn coating and having a good electrodeposition coating performance, even with a lower layer comprising a pure Zn coating or a Zn alloy coating.

TABLE 1

| Conditions for lower layer coating | | | |
|---|---|---|---|
| Pure Zn coating | | Zn—Fe alloy coating | |
| Plating bath composition: | | | |
| Zinc sulfate | 240 g/lit | Ferrous sulfate | 280 g/lit |
| Sodium sulfate | 75 g/lit | Zinc sulfate | 75 g/lit |
| | | Sodium sulfate | 85 g/lit |
| Plating conditions: | | | |
| pH | 1.5 | pH | 1.6 |
| Bath temperature | 50° C. | Bath temperature | 50° C. |
| Current density | 20 A/dm$^2$ | Current density | 40 A/dm$^2$ |
| Others: | | | |
| — | | Fe content | 15 to 20 wt. % |
| | | Coating weight (per one side) | 20 g/m$^2$ |

| Zn—Ni alloy coating | |
|---|---|
| Plating bath composition: | |
| Nickel sulfate | 260 g/lit |
| Zinc sulfate | 150 g/lit |
| Sodium sulfate | 70 g/lit |
| Plating conditions: | |
| pH | 2.0 |
| Bath temperature | 55° C. |
| Current density | 40 A/dm$^2$ |
| Others: | |
| Ni content | 11 to 12 wt. % |
| Coating weight | 20 g/m$^2$ (per one side) |

| Conditions for upper layer coating | |
|---|---|
| Fe—B coating | |
| Plating bath composition: | |
| Ferrous sulfate | 250 g/lit |
| Sodium sulfate | 70 g/lit |
| Tartaric acid | 3 g/lit |
| Sodium metaborate | 10 to 50 g/lit |

TABLE 1-continued

| Plating conditions: | |
|---|---|
| Current density | 20 to 80 A/dm$^2$ |
| pH | 1.0 to 3.0 |
| Bath temperature | 50° C. |
| Others: | |
| Boron content was controlled depending on the combination of the concentration of sodium metaborate and the pH. Plating of boron-free Fe was carried out without addition of sodium metaborate. | |

TABLE 2

| Sample | Type of lower layer coating | Upper layer coating (Fe—B) B content (wt. %) | Coating weight (g/m$^2$) | Number of craterings |
|---|---|---|---|---|
| Present invention: | | | | |
| 1 | Zn | 0.050 | 4 | 0 to 5 |
| 2 | Zn | 0.21 | 2 | 0 to 5 |
| 3 | Zn—Ni | 0.002 | 8 | 0 to 6 |
| 4 | Zn—Fe | 0.009 | 5 | 0 to 5 |
| 5 | Zn—Fe | 0.032 | 1 | 1 to 5 |
| 6 | Zn—Fe | 0.75 | 4 | 0 to 5 |
| 7 | Zn—Fe | 2.6 | 3 | 1 to 5 |
| Comparative Example: | | | | |
| 1 | Zn | 0 | 0 | 10 to 18 |
| 2 | Zn | 0 | 2 | 4 to 25 |
| 3 | Zn—Ni | 0 | 3 | 5 to 23 |
| 4 | Zn—Fe | 0 | 1 | 15 to 28 |
| 5 | Zn—Ni | 0.0004 | 3 | 2 to 22 |
| 6 | Zn—Fe | 0.003 | 0.1 | 63 to 205 |

(Note 1) Comparative Examples 1 to 4 are provided with an upper layer comprising a boron-free Fe coating.
(Note 2) The coating weight in the upper layer refers to that per one side. (Ditto in Table 4, Examples 2 and 3 shown below)
(Note 3) The number of craterings refers to the minimum to maximum number in 10 sheets (per coating area of 5 cm × 5 cm).

EXAMPLE 2

A cold rolled steel sheet of 0.8 mm thick was treated in the same manner as in Example 1 to make its surface clean. Thereafter, a lower layer coating comprising a Zn-Fe alloy or a Zn-Ni alloy was first provided under the conditions as shown in Table 3, and next an upper layer coating comprising a boron containing Fe-Zn alloy or a boron-free Fe-Zn alloy was provided on it.

Subsequently, samples were collected from this plated steel sheet, and subjected to phosphating and electrodeposition coating in the same manner as in Example 1 to produce coated steel sheets having a coating film thickness of 23 um. The number of craterings generated in the coating film when provided with a boron-containing high Fe-Zn alloy coating as the upper layer is shown in Table 4.

TABLE 3

| Conditions for lower layer coating | | | |
|---|---|---|---|
| Zn—Fe alloy coating | | Zn—Fe alloy coating | |
| Plating bath composition: | | | |
| Ferrous sulfate | 280 g/lit | Nickel sulfate | 260 g/lit |
| Zinc sulfate | 75 g/lit | Zinc sulfate | 150 g/lit |
| Sodium sulfate | 85 g/lit | Sodium sulfate | 70 g/lit |
| Plating conditions: | | | |
| Current density | 40 A/dm$^2$ | Current density | 40 A/dm$^2$ |
| Bath temp. | 50° C. | Bath temperature | 55° C. |
| pH | 1.6 | pH | 2.0 |
| Others: | | | |
| Fe content | 15 to 20 wt. % | Ni content | 11 to 12 wt. % |
| Coating weight (per one side) | 20 g/m$^2$ | Coating weight (per one side) | 20 g/m$^2$ |

| Conditions for upper layer coating | |
|---|---|
| Boron-containing high Fe—Zn alloy | |
| Plating bath composition: | |
| Ferrous sulfate | 250 g/lit |
| Zinc sulfate | 28 g/lit |
| Sodium sulfate | 75 g/lit |
| Sodium metaborate | 10 to 50 g/lit |
| Plating conditions: | |
| Current density | 40 to 70 A/dm$^2$ |
| Bath temp. | 50° C. |
| pH | 1.5 to 3.0 |
| Others: | |
| Fe content was based on the combination of the current density and the pH, and Boron content was controlled based on the combination of the concentration of sodium metaborate and the pH. | |

TABLE 4

| Sample | Type of lower layer coating | Upper layer coating B content (wt. %) | Fe content (wt. %) | Coating weight (g/m$^2$ one side) | Number of craterings |
|---|---|---|---|---|---|
| Present invention: | | | | | |
| 1 | Zn—Ni | 0.003 | 82 | 5 | 2 |
| 2 | Zn—Ni | 0.018 | 98 | 2 | 1 |
| 3 | Zn—Ni | 2.21 | 55 | 3 | 1 |
| 4 | Zn—Ni | 0.08 | 65 | 1 | 2 |
| 5 | Zn—Ni | 0.92 | 72 | 0.7 | 2 |
| 6 | Zn—Fe | 0.20 | 90 | 0.4 | 3 |
| 7 | Zn—Fe | 1.62 | 85 | 1 | 0 |
| 8 | Zn—Fe | 2.61 | 53 | 7 | 0 |
| 9 | Zn—Fe | 0.05 | 60 | 1.5 | 0 |
| Comparative Example: | | | | | |
| 1 | Zn—Ni | 0 | 55 | 5 | 25 |
| 2 | Zn—Ni | 0 | 68 | 8 | 3 |
| 3 | Zn—Fe | 0 | 70 | 1 | 19 |
| 4 | Zn—Fe | 0 | 69 | 2 | 12 |
| 5 | Zn—Fe | 0 | 85 | 6 | 5 |

(Note) Comparative Examples are provided with an upper layer comprising a boron-free Fe—Zn alloy coating.

EXAMPLE 3

A steel strip of 0.6 mm thick and 300 mm wide was reduced in a pre-treatment oven of a gas reduction system, and thereafter passed through a pressurizing chamber for preventing inflow of gas or air and a seal roll chamber in which pressure is stepwise reduced by means of a number of seal rolls, and then introduced into a first vacuum deposition chamber equipped with a vacuum deposition Zn bath of an electrical resistance heating system at a lower side of the position of the steel strip, to apply a deposition coating of pure Zn on one side of the steel strip. Subsequently, the steel strip was guided to a second vacuum deposition chamber disposed at a lower side of the above first vacuum deposition chamber and having the same construction as the first vacuum deposition chamber to apply a deposition coating of pure Zn on the opposite side of the steel strip, and thereafter passed through a seal roll chamber and a pressurizing chamber to produce a deposited steel strip having a coating weight of 50 g/m$^2$ (per one side). The plating was carried out under the conditions of a steel strip moving speed of 15 m/min and a vacuum degree of 0.01 Torr in both the first and second vacuum deposition chambers.

Next, part of the pure Zn-plated steel strip thus produced was introduced in an oven having an atmosphere of a mixed gas (dew point: −25° C.) comprising 3% of $H_2$ and 97% of $N_2$, and heated to 280° C. to form the coating into a Zn-Fe alloy, thereby producing a steel strip provided with a coating of a Zn-Fe alloy having an Fe percentage of 10 wt. %.

Thereafter, this Zn-Fe alloy plated steel strip and the pure Zn-plated steel strip were subjected to electroplating to respectively provide a Fe coating or a Fe-B coating under the same conditions as those for the upper layer coating shown in Table 1, and a boron-containing high Fe-Zn coating under the same conditions as those for the upper layer coating shown in Table 3, followed by carrying out electrodeposition coating under the same conditions as in Example 1. The states of generation of craterings in the coating film are shown in Table 5 and Table 6.

TABLE 5

| Sample | Type of lower layer coating | Upper layer coating | | |
|---|---|---|---|---|
| | | B content (wt. %) | Coating weight (g/m², one side) | Number of craterings |
| Present invention: | | | | |
| 1 | Zn | 0.041 | 3 | 0 to 5 |
| 2 | Zn | 0.23 | 2 | 0 to 5 |
| 3 | Zn | 0.002 | 9 | 0 to 5 |
| 4 | Zn—Fe | 0.003 | 5 | 1 to 5 |
| 5 | Zn—Fe | 0.06 | 4 | 0 to 5 |
| 6 | Zn—Fe | 2.3 | 2 | 1 to 5 |
| Comparative Example: | | | | |
| 1 | Zn | 0 | 0 | 10 to 20 |
| 2 | Zn | 0 | 2 | 5 to 25 |
| 3 | Zn—Fe | 0 | 4 | 4 to 25 |
| 4 | Zn—Fe | 0 | 2 | 15 to 30 |
| 5 | Zn | 0.0004 | 5 | 3 to 30 |
| 6 | Zn | 0.02 | 0.1 | 5 to 50 |
| 7 | Zn—Fe | 0.0003 | 6 | 5 to 30 |
| 8 | Zn—Fe | 0.005 | 0.1 | 4 to 47 |

(Note) Comparative Examples 1 to 4 are provided with an upper layer comprising a boron-free Fe coating.

TABLE 6

| Sample | Type of lower layer coating | Upper layer coating | | | |
|---|---|---|---|---|---|
| | | B content (wt. %) | Fe content (wt. %) | Coating weight (g/m², one side) | Number of craterings |
| Present invention: | | | | | |
| 1 | Zn—Ni | 0.003 | 81 | 5 | 1 |
| 2 | Zn—Ni | 0.02 | 93 | 2 | 1 |
| 3 | Zn—Ni | 0.12 | 60 | 1 | 1 |
| 4 | Zn—Ni | 2.1 | 55 | 0.6 | 2 |
| 5 | Zn—Fe | 0.006 | 58 | 0.5 | 2 |
| 6 | Zn—Fe | 0.52 | 72 | 1 | 0 |
| 7 | Zn—Fe | 0.41 | 83 | 8 | 0 |
| 8 | Zn—Fe | 2.6 | 90 | 1.5 | 0 |
| Comparative Example: | | | | | |
| 1 | Zn | 0 | 56 | 5 | 26 |
| 2 | Zn | 0 | 70 | 8 | 10 |
| 3 | Zn—Fe | 0 | 61 | 2 | 23 |
| 4 | Zn—Fe | 0 | 86 | 6 | 13 |

(Note) Comparative Examples are provided with an upper layer comprising a boron-free Fe—Zn alloy coating.

The plated steel sheet according to this invention can achieve a good coating appearance when used not only in automobile body components but also in other components such as electrical equipment components for domestic use and construction components on which the electrodeposition coating is carried out. Since also having an excellent coating performance for coating materials other than the coating materials for the electrodeposition, the present steel sheet can be also applied in such a use for general coating.

We claim:

1. A plated steel sheet having an excellent coating performance, comprising a steel sheet; a lower layer coating of pure Zn or a Zn alloy, provided on the steel sheet; and an upper layer coating of an Fe-Zn alloy having an Fe percentage of 50 wt. % or more, provided on said lower layer coating, said upper layer coating containing from about 0.001 to 3 wt. % of boron.

2. A plated sheet according to claim 1, wherein the upper layer coating has a coating weight of from about 0.2 to 8 g/m².

3. A plated steel sheet having an excellent coating peformance, comprising a steel sheet; a lower layer coating of pure Zn or a Zn alloy, provided on the steel sheet; and an upper layer coating of Fe provided on said lower layer coating, said upper layer coating containing from about 0.001 to 3 wt. % of boron.

4. A plated sheet according to claim 3, wherein the upper layer coating has a coating weight of from about 0.5 to 10 g/m².

5. A plated sheet according to claim 1, wherein said Zn alloy comprises a Zn-Ni or a Zn-Fe alloy.

6. A plated sheet according to claim 5, wherein said alloy further comprises a trace amount of one or more additional elements selected from Ni, Fe, Co, Cr, Mn, Mo and Ti.

7. A plated sheet according to claim 3, wherein said Zn alloy comprises a Zn-Ni or a Zn-Fe alloy.

8. A plated sheet according to claim 7, wherein said alloy further comprises a trace amount of one or more additional elements selected from Ni, Fe, Co, Cr, Mn, Mo and Ti.

9. A plated sheet according to claim 1, wherein said upper layer coating has been applied by electrodeposition in the presence of at least one boron compound.

10. A plated sheet according to claim 9, wherein said boron compound comprises boric acid, metaboric acid, a water soluble metaborate, a water soluble tetraborate or a tetrafluoroborate.

11. A plated sheet according to claim 3, wherein said upper layer coating has been applied by electrodeposition in the presence of at least one boron compound.

12. A plated sheet according to claim 11, wherein said boron compound comprises boric acid, metaboric acid, a water soluble metaborate, a water soluble tetraborate or a tetrafluoroborate.

* * * * *

UNITED STATES PATENT AND TRADEMARK OFFICE
CERTIFICATE OF CORRECTION

PATENT NO. : 4,835,066
DATED      : May 30, 1989
INVENTOR(S) : Taisuke et al.

It is certified that error appears in the above—identified patent and that said Letters Patent is hereby corrected as shown below:

On the title page, Item [19] should read --Irie et al--

At [75] Inventors:

"Irie Taisuke" should read --Taisuke IRIE--;

"Kotegawa Junichi" should read --Junichi KOTEGAWA--;

"Watanabe Koichi" should read --Koichi WATANABE--; and

"Hukuda Satoshi" should read --Satoshi HUKUDA--.

Signed and Sealed this

Fourth Day of December, 1990

Attest:

HARRY F. MANBECK, JR.

*Attesting Officer*     *Commissioner of Patents and Trademarks*